United States Patent [19]

Peiffer et al.

[11] Patent Number: 5,693,414

[45] Date of Patent: Dec. 2, 1997

[54] HEAT-SEALABLE OR NON-HEAT-SEALABLE, ORIENTED, LAYERED OLEFIN POLYMER FILM COMPRISING AMORPHOUS POLYMER PARTICLES

[75] Inventors: Herbert Peiffer, Mainz; Thomas Dries, Schwabenheim; Ursula Murschall, Nierstein; Michael Schreck, Frankfurt, all of Germany

[73] Assignee: Hoechst Aktiengesellschaft, Germany

[21] Appl. No.: 504,639

[22] Filed: Jul. 20, 1995

[30] Foreign Application Priority Data

Jul. 23, 1994 [DE] Germany .............. 44 26 185.3
Jul. 23, 1994 [DE] Germany .............. 44 26 184.5

[51] Int. Cl.⁶ .................................................. B32B 5/16
[52] U.S. Cl. .................... 428/327; 428/516; 428/903; 428/910; 156/244.11
[58] Field of Search ................... 428/321, 516, 428/903, 910; 156/244.11

[56] References Cited

U.S. PATENT DOCUMENTS

| | | | |
|---|---|---|---|
| 4,118,438 | 10/1978 | Matsui et al. | 525/177 |
| 4,291,090 | 9/1981 | Kenji et al. | 428/327 |
| 4,927,885 | 5/1990 | Hayashida et al. | 525/211 |
| 5,077,129 | 12/1991 | Schinkel et al. | 428/402 |
| 5,246,763 | 9/1993 | Murschall et al. | 428/195 |
| 5,302,427 | 4/1994 | Murschall et al. | 428/34.2 |
| 5,433,983 | 7/1995 | Schulmann et al. | 428/357 |
| 5,489,454 | 2/1996 | Peiffer et al. | 428/34.9 |
| 5,494,717 | 2/1996 | Peiffer et al. | 428/34.9 |
| 5,496,600 | 3/1996 | Peiffer et al. | 428/35.7 |
| 5,498,474 | 3/1996 | Schulmann et al. | 428/323 |
| 5,501,901 | 3/1996 | Schuhmann et al. | 428/323 |
| 5,573,717 | 11/1996 | Peiffer et al. | 264/45.1 |

FOREIGN PATENT DOCUMENTS

| | | |
|---|---|---|
| 0 430 472 | 6/1991 | European Pat. Off. . |
| 0 447 652 | 9/1991 | European Pat. Off. . |
| 0 454 420 | 10/1991 | European Pat. Off. . |
| 38 34 622 | 4/1989 | Germany . |

Primary Examiner—H. Thi Le
Attorney, Agent, or Firm—Connolly & Hutz

[57] ABSTRACT

The disclosed oriented, multilayer olefin polymer film comprises a polyolefinic base layer and at least one heat-sealable or non-heat-sealable top layer. The top layer contains at least one olefin polymer and at least one amorphous polymer which is in the olefin polymer in the form of separated or discrete, substantially non-agglomerated particles. The discrete, substantially non-agglomerated particles form during the coextrusion process for the production of the multilayer film. The film is useful for printing, lamination, and packaging.

18 Claims, No Drawings

HEAT-SEALABLE OR NON-HEAT-SEALABLE, ORIENTED, LAYERED OLEFIN POLYMER FILM COMPRISING AMORPHOUS POLYMER PARTICLES

FIELD OF THE INVENTION

The invention relates to an oriented, layered polyolefin film comprising a polyolefinic base layer and at least one heat-sealable or non-heat-sealable top layer. Both the heat-sealable and the non-heat-sealable multilayer films are distinguished by low haze, high gloss and a low coefficient of friction. Other aspects of the invention include the preparation of these films and their use as packaging films or as layers (which can be printed upon) which are laminated to paper or board.

DESCRIPTION OF THE PRIOR ART

The prior art describes transparent films having low coefficients of friction. The demands on the processing properties of the films and their smooth running through automatic machines have constantly increased over the years. For this reason, ever-lower coefficients of friction are required, with the term "low" friction values today covering an order of magnitude of from 0.3 to 0.1, while a friction of from 0.4 to 0.5 was regarded as extremely low a few years ago.

DE-A-20 01 032 describes films made from various thermoplastics whose surface-slip characteristics have been improved by addition of carboxamides and antiblocking agents. Since it is not possible for a sufficient amount of lubricant to be incorporated into the top layers alone, the additional incorporation of the amides into the base layer is recommended. These films have a coefficient of friction in the range from 0.4 to 0.8 and thus no longer meet today's quality requirements.

U.S. Pat. No. 4,117,193 describes multilayer films comprising a polypropylene base layer containing a lubricant, an antiblocking agent and an antistatic. The top layer of these films comprises a polymer blend and additionally contains a lubricant and an antiblocking agent. The polymer blend comprises an ethylene-butylene copolymer and a polyolefinic resin such as HDPE or LDPE. It is stated that the poor surface-slip characteristics of the films cannot be sufficiently improved by the addition of lubricants and antiblocking agents alone. For this reason, the top layer is modified by addition of HDPE or LDPE in combination with a lubricant and antiblocking agent. According to the examples and comparative examples, the reduction in the coefficient of friction is essentially due to the addition of HDPE. Pure copolymeric top layers with the same additive composition have coefficients of friction of from 0.7 to 0.8. The films combine excellent coefficients of friction with good printability, but are highly unsatisfactory in haze and gloss owing to the addition of the friction-reducing polyolefinic resin.

EP-A-0 402 100 describes polypropylene films which contain from 0.01 to 0.5% by weight of a spherical $SiO_2$ and from 0.3 to 5% by weight of a hydroxy fatty acid glyceride. This invention relates to single-layer and multilayer films. Multilayer embodiments contain the combination of $SiO_2$ and glyceride both in the top layer and in the base layer. It is stated that the selected amounts of $SiO_2$ and glyceride are essential for the advantageous properties of the films and deviations from these ranges no longer give the desired result. The films are distinguished by good transparency, surface-slip characteristics and adhesion to metal. However, they have a coating on the surface after an extended storage time which impairs the appearance of the films. This effect is also known as blooming and is caused by migration of certain additives, in particular the glycerides, to the surface of the films.

EP-A-0 182 463 describes a multilayer film which contains from 0.05 to 0.2% by weight of tertiary aliphatic amine in the base layer and a combination of silicone oil and $SiO_2$ in the heat-sealable top layer. According to the description, the surprising interaction of $SiO_2$, silicone oil and amine in combination with a selected top layer thickness of less than 0.8 µm gives films having coefficients of friction of 0.3 or less. In spite of this excellent coefficient of friction, the processing properties of the film are poor. In particular, it is not printable and is therefore unsuitable for many applications.

EP-A-0 143 130 discloses films which contain a carboxamide in the base layer and likewise the combination of silicone oil and $SiO_2$ in the top layer. Like in the above-mentioned EP-A-0 182 463, a synergistic action of the three selected components on the coefficient of friction is described. These films likewise have poor processing properties in spite of their advantageous surface-slip characteristics. Again, they lack the important property of printability.

EP-A-0 242 055 describes the use of an infusible organosiloxane resin powder having a three-dimensional network structure as antiblocking agent in films. Both the silicone resin and the propylene polymer are employed in the form of a powder comprising particles having a virtually spherical shape, this particle shape being characterized by a corresponding equation for the actual degree of sphericity. The films are said to be improved over the prior art with respect to their transparency, antiblocking properties, sliding properties and appearance. The propylene/antiblocking agent mixture can also be employed as top layer material for coextruded multilayer films. However, these coextruded multilayer films are still unsatisfactory with respect to their transparency and gloss values, in particular if the top layers are applied in conventional thicknesses of greater than 0.5 µm. In addition, this antiblocking agent is very much more expensive than conventional antiblocking agents.

German Patent Application P 43 06 154.0 describes the use of an organically coated $SiO_2$ as antiblocking agent in heat-sealable films. The coefficient of friction and processing behavior of the film has been improved. This specification makes no mention of the spatial shape of the antiblocking particles.

EP-A-0 353 368 describes the use of the siloxane resin powder described in EP-A-0 242 055 in combination with a hydroxyfatty acid glyceride. These films are particularly suitable for vacuum vapor deposition, but have very poor gloss and transparency.

One important use of transparent oriented propylene polymer is in glass-lamination with paper or board. The films are generally non-heat-sealable, since the lamination takes place by the adhesive bonding of film and paper/board.

This use of transparent, oriented, non-heat-sealable propylene polymer films also makes high demands of the film appearance and processing properties. The optical properties of the film are principally described by the surface gloss and the haze. For the processing properties, the friction, antistatic properties, abrasion behaviour, thickness profile, roll make-up and flat-lying (ability to lay flat) of the film are of great importance.

The non-heat-sealable, layered propylene polymer films typically also need a low coefficient of friction, for essentially the same reasons as the heat-sealable layered films, and such films are described in the prior art.

EP-A-0 124 310 describes films having a low coefficient of friction which comprise a thick base layer and a thin top layer containing finely divided inorganic particles. The inorganic particles mentioned are $SiO_2$, aluminum silicates, sodium aluminum silicates and carbon black. The particle size is in the range from 0.2 to 5.0 µm. The particles have an advantageous effect on the coefficients of friction of the film. However, the film is still highly unsatisfactory with respect to its roll makeup and flat-lying.

EP-A-0 350 168 describes a film having differentiated sliding properties of the two surfaces. The top layers are heat-sealable and contain $SiO_2$ as antiblocking agent.

EP-A-0 234 758 describes a multilayer polyolefin film having good absorption capacity for water-based coatings. The polypropylene top layer contains an antiblocking agent and silicone oil. $SiO_2$, silicates, chalk, clay and the like are described as suitable antiblocking agents, but no detailed mention is made of the particle size of the various antiblocking agents.

DE-A-35 17 795 describes multilayer polypropylene films whose top layer contains a combination of amine, polydialkylsiloxane and platelet-shaped inorganic pigment. The film is distinguished by good antiblocking and sliding properties. The platelet-shaped pigment has a leaf structure. Suitable pigments are silicates and carbonates.

EP-A-0 242 055, EP-A-0 353 368, and German Patent Application P 43 06 154.0, discussed previously, are also of interest in this context.

In both heat-sealable and non-heat-sealable, multilayer propylene polymer films, it has been found that some of the known antiblocking agents have adverse effects on certain film properties. The antiblocking agent can impair the transparency and the gloss of the film. The improvement in friction is generally achieved at the expense of an increase in surface roughness. $SiO_2$ as antiblocking agent in the production of the films results in deposits on the die lip and in abrasion on the rolls. This means that the die lip and the rolls must be cleaned frequently, since the film otherwise runs poorly during production and the deposits on the die lip result in streaking on the film. In addition, problems occur during corona treatment. The corona treatment breaks through in the areas of the roll where $SiO_2$ abrasion has occurred and results in the undesired phenomenon known as the reverse-side effect. This causes unacceptable flaws during further processing of the film, such as, for example, printing or metallization.

SUMMARY OF THE INVENTION

The present invention has various objectives, one of which is to provide a multilayer film which is distinguished by a combination of the following properties:

high gloss low haze a low coefficient of friction low surface roughness, and, preferably, low abrasion.

Still another objective of this invention is to avoid, substantially or even entirely, the disadvantages of the prior art films. For example, the use of both $SiO_2$ and silicones (polysiloxanes) in the top or outermost, heat-sealable or non-heat-sealable layer can be avoided, if desired, but without substantially sacrificing the low coefficient of friction required by today's film processing requirements.

These objectives appear to have been achieved by an oriented, multilayer olefin polymer film (i.e. an olefin polymer film having a plurality of layers) having an olefin polymer base layer and at least one heat-sealable or non-heat-sealable top or outermost layer, wherein the heat-sealable or non-heat-sealable top layer comprises at least one amorphous polymer which is in the top layer in the form of separated particles, i.e. as a discrete phase comprising substantially non-agglomerated, discrete particles. The amorphous, discrete particle-forming polymer provides, among other things, antiblocking effects and is preferably present in the top or outermost layer of the layered olefin polymer film in a minor amount, the major amount being a conventional heat-sealable or non-heat-sealable olefin polymer. The reasons why this minor amount of amorphous polymer forms separate or discrete particles or a discrete phase are not presently understood, and this invention is not bound by any theory. It is presently believed that the minor amount of amorphous polymer, like the heat-sealable or non-heat-sealable olefin polymer of the top or outermost layer, can be liquefied in an extruder prior to film extrusion through a die, but, upon extrusion and orientation, instead of forming a single phase with the heat-sealable or non-heat-sealable polymer, the amorphous polymer loses whatever compatibility it may have with the major amount of conventional olefin polymer and forms tiny (e.g. 0.2 to 20 µm in mean particle diameter), essentially non-agglomerated particles which are trapped in the matrix provided by the relatively large amount of conventional olefin polymer. This discrete particle formation appears to occur regardless of whether the amorphous polymer is added as powdered material or as a masterbatch (in high concentration in the conventional olefin polymer) or in any bulk or non-particulate form.

Preferably, these discrete, substantially non-agglomerated particles are approximately spherical. At room temperature, the amorphous polymer which has formed these tiny, substantially non-agglomerated particles is well below its glass transition temperature ($T_G$).

The layered, oriented, olefin polymer films of this invention can include a conventional base layer and, if desired, conventional interlayers. These films are preferably (but not necessarily) transparent. It is not essential to this invention, however, that the base layer contain friction-reducing agents (e.g. lubricants) capable of migrating to the outermost layers. Nor is it essential that the polymer contained in the top or outermost layer contain a high percentage of repeating ethylene units, although, for heat-sealable embodiments of this invention, a sufficient amount of ethylene or some other olefin other than propylene should be present in the polymer as a comonomer to insure heat-sealability.

DETAILED DESCRIPTION

The films of this invention are "multilayer" films, i.e. films having a plurality of layers (at least two, typically three or more). A relatively thick layer (which is typically the innermost layer) is called the "base layer" or "core layer".

The base or core layer of a multilayer film of this invention comprises a polyolefin, preferably a propylene polymer, and, if desired, further additives in effective amounts in each case. In general, the base layer comprises at least 50% by weight, preferably from 75 to 100% by weight, in particular from 90 to 100% by weight, of the propylene polymer and can comprise a polypropylene homopolymer, if desired, or a mixed-unit olefin polymer having at least one additional repeating unit besides propylene, but it is preferred that the propylene polymer comprises from 90 to 100% by weight, preferably from 95 to 100% by weight, in particular from 98 to 100% by weight, of propylene.

When propylene units predominate in this manner, the polymer has a melting point of 120° C. or above, preferably from 150° to 170° C., and the polymer generally has a melt flow index of from 0.5 to 8 g/10 min, preferably from 2 to 5 g/10 min, at 230° C. and a force of 21.6N (DIN 53 735). Isotactic propylene homopolymer having an atactic content of 15% by weight or less, mixed-unit polymers of ethylene and propylene having an ethylene content of 10% by weight or less, mixed-unit polymers of propylene and $C_4$—$C_8$—α-olefins having an α-olefin content of 10% by weight or less, terpolymers of propylene, ethylene and butylene having an ethylene content of 10% by weight or less and a butylene content of 15% by weight or less are preferred propylene polymers for the core layer, particular preference being given to isotactic propylene homopolymer. The percentages by weight given are based on the particular polymer.

Also suitable is a mixture of said propylene homopolymers with one or more other, compatible, olefinic homopolymers and/or copolymers and/or other mixed-unit polymers (e.g. terpolymers), in particular polymers comprising monomers having 2 to 6 carbon atoms, where the mixture comprises at least 50% by weight, in particular at least 75% by weight, of propylene polymer. Other polyolefins which are suitable in the polymer mixture are polyethylenes, in particular HDPE, LDPE and LLDPE, where the proportion of these polymers does not exceed 15% by weight in each case, based on the polymer mixture.

In general, the base layer can optionally contain lubricants, antistatics, stabilizers and/or neutralizers in effective amounts in each case, and also, if desired, hydrocarbon resin. However, as noted previously, antiblocking and friction-reducing effects can be obtained even without lubricants in the top layer or lubricants which migrate from the base layer. If lubricants are used, it is preferred that they be added to the base layer.

A multilayer film of this invention optionally contains one or more interlayer(s) between the base layer and the top layer. This (these) interlayer(s) which can be present preferably comprise(s) propylene polymers or polypropylene mixtures, as described above for the base layer. In principle, the base layer and the interlayer(s) can comprise the same or different propylene polymers or mixtures. The melt flow indices of the polymers for the core layer and interlayer(s) should be as close as possible in magnitude. If necessary, the MFI of the interlayer(s) can be somewhat higher, with a maximum difference of 20%. If desired, additives in effective amounts in each case can be added to the interlayers.

In a white or opaque or white/opaque embodiment, the base layer additionally contains pigments or vacuole-inducing particles or a combination thereof. Such films have a light transparency, measured in accordance with ASTM-D 1033-77, of at most 50%, preferably at most 70%.

Pigments are particles which result in essentially no vacuole formation during stretching of the film. The coloring action of the pigments is caused by the particles themselves. The term "pigment" is generally associated with a particle size of from 0.01 to a maximum of 1 μm and covers both "white pigments", which give the films a white color, and "colored pigments", which give the film a colored or black color. In general, the mean particle diameter of the pigments is in the range from 0.01 to 1 μm, preferably from 0.01 to 0.7 μm, in particular from 0.01 to 0.4 μm. The base layer generally contains pigments in an amount of from 1 to 25% by weight, in particular from 2 to 20% by weight, preferably from 5 to 15% by weight, in each case based on the base layer.

It is generally not necessary to include either pigments or vacuole-inducing particles in the top or outermost heat-sealable or non-heat-sealable layer.

Conventional pigments are materials such as, for example, aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, preference being given to white pigments such as calcium carbonate, silicon dioxide, titanium dioxide and barium sulfate.

The titanium dioxide particles comprise at least 95% by weight of rutile and are preferably employed with a coating of inorganic oxides, as is usually used as a coating for $TiO_2$ white pigment in papers or paints for improving the light fastness. Particularly suitable inorganic oxides include the oxides of aluminum, silicon, zinc and magnesium or mixtures of two or more of these compounds. They are precipitated from water-soluble compounds, for example alkali metal aluminates, in particular sodium aluminates, aluminum hydroxide, aluminum sulfate, aluminum nitrate, sodium silicate or salicylic acid, in the aqueous suspension. Coated $TiO_2$ particles are described, for example, in EP-A-0 078 633 and EP-A-0 044 515.

The coating can also contain organic compounds containing polar and nonpolar groups. Preferred organic compounds are alkanols and fatty acids having 8 to 30 carbon atoms in the alkyl group, in particular fatty acids and the primary n-alkanols having 12 to 24 carbon atoms, and polydiorganosiloxanes and/or polyorganohydrosiloxanes, such as polydimethylsiloxane and polymethylhydrosiloxane.

The coating on the $TiO_2$ particles usually comprises from 1 to 12 g, in particular from 2 to 6 g, of inorganic oxides, and if desired additionally from 0.5 to 3 g, in particular from 0.7 to 1.5 g, of organic compounds, in each case based on 100 g of $TiO_2$ particles. It has proven particularly advantageous for the $TiO_2$ particles to be coated with $Al_2O_3$ or with $Al_2O_3$ and polydimethylsiloxane.

Opaque embodiments of the films contain vacuole-inducing particles, which are incompatible with the polymer matrix and result in the formation of vacuole-like cavities when the films are stretched, the size, type and number of vacuoles being dependent on the material and on the size of the solid particles and the stretching conditions, such as stretching ratio and stretching temperature. The vacuoles give the films a characteristic, pearlescent, opaque appearance caused by light scattering at the vacuole/polymer matrix interfaces. In general, the mean particle diameter of the vacuole-inducing particles is from 1 to 6 μm, preferably from 1.5 to 5 μm. The base layer generally contains vacuole-inducing particles in an amount of from 1 to 25% by weight.

Conventional vacuole-inducing particles in the base layer are inorganic and/or organic materials which are incompatible with polypropylene, such as aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, preference being given to calcium carbonate, silicon dioxide and titanium dioxide. Suitable organic, vacuole-inducing particles are the usual polymers which are incompatible with the polymer of the base layer, in particular those such as HDPE, polyesters, polystyrenes, polyamides and halogenated organic polymers, preference being given to polyesters, such as, for example, polybutylene or polyethylene terephthalates. For the purposes of the present invention, "incompatible materials" or "incompatible polymers" means that the material or polymer is present in the film as separate particles or as a separate phase.

White/opaque films to which vacuole-initiating particles and pigments have been added contain the vacuole-initiating particles in an amount of from 1 to 10% by weight, preferably from 1 to 5% by weight, and pigment in an amount of from 1 to 7% by weight, preferably from 1 to 5% by weight. As indicated above, these particles and pigments are generally added to the base layer and can, if desired, be confined to that layer or to the base layer and one or more interlayers.

The density of the opaque or white films can vary within broad limits and depends on the type and amount of the fillers. The density is generally in the range from 0.4 to 1.1 g/cm³. Pigmented films have a density in the order of 0.9 g/cm³ or above, preferably in the range from 0.9 to 1.1 g/cm³. Films containing only vacuole-initiating particles have an apparent density of less than 0.9 g/cm³. For packaging films having a content of vacuole-initiating particles of from 2 to 5% by weight, the density is in the range from 0.6 to 0.85 g/cm³. For films having a content of vacuole-initiating particles of from 5 to 14% by weight, the density is in the range from 0.4 to 0.8 g/cm³. Films containing pigments and vacuole-initiating particles have a density in the range from 0.5 to 0.85 g/cm³, depending on the ratio between the pigment content and the content of vacuole-initiating particles.

In a preferred embodiment of the novel film, the propylene polymer of the base layer and/or interlayer is peroxidically degraded.

A measure of the degree of degradation of the polymer is the degradation factor A, which gives the relative change in melt flow index, measured in accordance with DIN 53 735, of the polypropylene, based on the starting polymer.

$$A = \frac{MFI_2}{MFI_1}$$

$MFI_1$=melt flow index of the propylene polymer before addition of the organic peroxide $MFI_2$=melt flow index of the peroxidically degraded propylene polymer.

In general, the degradation factor A of the propylene polymer employed is in a range from 3 to 15, preferably from 6 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di(t-butylperoxy)hexane and di-t-butyl peroxide.

The polyolefin films of this invention comprise at least one heat-sealable or non-heat-sealable top or outermost layer.

A suitable heat-sealable top layer comprises heat-sealable polymers of α-olefins having 2 to 10 carbon atoms and the amorphous polymer in the form of separated particles and, if desired, further additives in effective amounts in each case. In general, the heat-sealable top layer comprises from 75 to virtually 100% by weight, in particular from 90 to 99.5% by weight, of the heat-sealable α-olefinic polymer.

A suitable non-heat-sealable top or outermost layer comprises non-heat-sealable polypropylene (and the amorphous polymer in the form of separated particles) and, if desired, further additives in effective amounts in each case. In general, the non-heat-sealable top layer comprises from 75 to virtually 100% by weight, in particular from 90 to 99.5% by weight, of the propylene polymer. The propylene polymer comprises from 95 to 100% by weight, preferably from 98 to 100% by weight, of propylene and has a melting point of 140° C. or above, preferably from 150° to 170° C., and generally has a melt flow index of from 0.5 to 8 g/10 min, preferably from 2 to 5 g/10 min, at 230° C. and a force of 21.6N (DIN 53 735). Isotactic propylene homopolymer having an atactic content of 15% by weight or less, copolymers of ethylene and propylene having an ethylene content of 3% by weight or less and copolymers of propylene with $C_4$—$C_8$—α-olefins having an α-olefin content of 3% by weight or less are preferred propylene polymers for the non-heat-sealable top layer, particular preference being given to isotactic propylene homopolymer. The percentages by weight given are based on the particular polymer.

If desired, all the top layer polymers can have been peroxidically degraded in the same way as described above for the base layer, in principle using the same peroxides. The degradation factor for the top layer polymers is generally in the range from 3 to 15, preferably from 6 to 10.

The heat-sealable polymers used in the top or outermost layer of heat-sealable embodiments of this invention preferably comprise heat-sealable polymers of α-olefins having 2 to 10 carbon atoms, including mixed-unit α-olefin polymers and/or polymer blends containing homopolymers and/or mixed-unit polymers. If desired, additives in effective amounts in each case can be included. In general, the heat-sealable top layer comprises from 75 to virtually 100% by weight, in particular from 90 to 99.5% by weight, of the heat-sealable α-olefinic polymer.

Examples of mixed-unit (copolymerized) α-olefinic polymers are
a copolymer of
 ethylene and propylene or
 ethylene and 1-butylene or
 propylene and 1-butylene or
a terpolymer of
 ethylene and propylene and 1-butylene or a mixture of two or more of said homopolymers, copolymers and terpolymers or
a blend of two or more of said mixed-unit polymers, if desired mixed with one or more of said homopolymers, copolymers and terpolymers,
particular preference being given to
 random ethylene-propylene copolymers having an ethylene content of from 1 to 10% by weight, preferably from 2.5 to 8% by weight, or
 random propylene-1-butylene copolymers having a butylene content of from 2 to 25% by weight, preferably from 4 to 20% by weight,
 in each case based on the total weight of the copolymer, or
 random ethylene-propylene-1-butylene terpolymers having
  an ethylene content of from 1 to 10% by weight, preferably from 2 to 6% by weight, and
  a 1-butylene content of from 2 to 20% by weight, preferably from 4 to 20% by weight, in each case based on the total weight of the terpolymer, or
a blend of an ethylene-propylene-1-butylene terpolymer and a propylene-1-butylene copolymer
 having an ethylene content of from 0.1 to 7% by weight
 and a propylene content of from 50 to 90% by weight
 and a 1-butylene content of from 10 to 40% by weight,
  in each case based on the total weight of the polymer blend.

Thus, the use of ethylene homopolymers or mixed-unit polymers containing a high percentage (e.g. more than 25%) of ethylene is not necessary in the top layer and is not preferred.

The above-described two-unit polymers generally have a melt flow index of from 1.5 to 30 g/10 min, preferably from 3 to 15 g/10 min, and a melting point in the range from 120° to 140° C. The terpolymers generally have a melt flow index in the range from 1.5 to 30 g/10 min, preferably from 3 to 15 g/10 min, and a melting point in the range from 120° to 140° C. The above-described blend of two-unit polymers and terpolymers generally has a melt flow index of from 5 to 9 g/10 min and a melting point of from 120° to 150° C. All the abovementioned melt flow indices are measured at 230° C. and a force of 21.6N (DIN 53 735).

According to the invention, the top layer of the film comprises at least one amorphous polymer in the form of separated particles, generally in an amount of at most 5% by weight, preferably from 0.001 to 3% by weight, in particular from 0.01 to 2% by weight, based on the weight of the top layer. It has been found that the amorphous polymer, which is a polymeric solid per se and, as a raw material, has no particulate character, is, surprisingly, in the top layer in the form of separated or discrete particles.

For the purposes of the present invention, amorphous polymers are taken to mean polymers which are solids at room temperature in spite of an irregular arrangement of the molecular chains. They are essentially non-crystalline, and their degree of crystallinity is generally less than 5%, preferably less than 2%, or is 0%. Particularly suitable amorphous polymers are those whose glass transition temperature $T_G$ is in the range from 70° to 300° C., preferably from 80° to 250° C., in particular from 100° to 200° C., or whose Vicat softening temperature $T_V$ (VST/B/120) is from 70° to 200° C., preferably from 80° to 180° C. In general, the amorphous polymer has a mean molecular weight $M_W$ in the range from 500 to 500,000, preferably from 1000 to 250,000, in particular from 3000 to 200,000.

As is well known in the art of polymer chemistry, the glass transition temperature ($T_G$) is manifested as a change in the temperature coefficient of thermodynamic functions such as specific volume (or density) and heat content. Other properties which change markedly at $T_G$ include thermal conductivity, refractive index, dielectric loss, and stiffness. Above $T_G$, many polymers acquire rubber-like characteristics, but below $T_G$, these characteristics are lost, and the polymer acquires more stiffness, brittleness, and resistance to deformation. On a microscopic level, a solid above the glass transition temperature has some of the properties of a liquid, since large-scale deformations are possible. The effects of glass transition are greatest for essentially or completely amorphous polymers and are much smaller for partially crystalline materials.

The refractive index of the amorphous polymer is generally in the range from 1.3 to 1.7, preferably from 1.4 to 1.6. It is particularly advantageous here if the refractive index of the amorphous polymer is in a certain ratio to the refractive index of the polyolefin of the top layer. In general, the refractive indices of the amorphous polymer and the polyolefin of the top layer differ by at most 0.1 units, preferably by at most 0.05 units.

The amorphous polymer is, surprisingly, present in the resultant film in the form of separated particles, which are clearly evident in transmitted-light photographs of the film surface. The particle size of the particles in the top layer is in the range from 0.2 to 20 μm, preferably from 0.5 to 1.5 μm.

It has been found that the particles of amorphous polymer are generally approximately spherical. For the purposes of the present invention, the term approximately spherical particles covers particles which satisfy the following condition:

$$f = \sqrt{A/(\pi/4)} \ / D_{max}$$

in which f is greater than 0.5, preferably from 0.7 to 1, and A is the cross-sectional area in mm² and $D_{max}$ is the maximum diameter of the cross-sectional area in mm. The factor f is a measure of the degree of sphericity of the particles. The closer the value of f to 1, the closer the shape of the particles to the ideal spherical shape.

In the case of non-heat-sealable multilayer films, it typically desirable for these films to be transparent, and it is also typically desirable that the non-heat-sealable top layer be a propylene polymer of extremely high propylene content (or a propylene homopolymer). Surprisingly, the separated particles of amorphous polymer in the non-heat-sealable top layer have little adverse effect on the excellent transparency of the film. It is known from the prior art that the incorporation of particulate fillers to a homopolymer base layer during stretching results in the formation of vacuole-like cavities in the layer (EP-A-0 083 495). The larger the particle size of the fillers, the larger the vacuoles formed. These filler-containing films have a characteristic virtually opaque appearance due to the vacuoles. It was therefore extremely surprising that the novel films have virtually unimpaired transparency, since a person skilled in the art would have expected the formation of vacuoles in the homopolymer top layer due to the separated, amorphous particles and thus a considerable increase in the haze of the film. Furthermore, it has been found, entirely unexpectedly, that the novel film exhibits virtually no abrasion phenomena during production or further processing.

Suitable amorphous polymers having the property profile described above are a multiplicity of generally transparent polymers. Examples thereof are atactic polystyrene ($T_G$=95° to 105° C., preferably 100° C.), poly-α-methyl styrene ($T_G$=170° to 180° C., preferably 175° C.), polyacrylates, in particular polymethyl methacrylate ($T_G$=115° to 130° C., preferably 122° C.), amorphous homopolymers and copolymers of polycyclic olefins ($T_G$=70° to 300° C. depending on composition and molecular weight), polyvinylcarbazole ($T_G$=180° to 220° C., preferably 200° C.), atactic polyvinylcyclohexane ($T_G$=130° to 150° C., preferably 140° C.), polyvinyl chloride ($T_G$=65° to 90° C., preferably 80° C.), polyacrylonitrile ($T_G$=100° to 110° C., preferably 106° C.), specific types of synthetic rubber which have relatively high $T_G$ values, in particular cyclorubber ($T_G$=70° to 120° C.), uncrosslinked, partially crosslinked and crosslinked dispersions of amorphous polymers ($T_G$ from 70° to 200° C. depending on polymerization partner and degree of polymerization). Suitable cycloolefin copolymers are known per se and are described in EP-A-0 407 870, EP-A-0 485 893, EP-A-0 503 422 and DE-A-40 36 264, which are expressly incorporated herein by way of reference.

The cycloolefin polymers (including mixed-unit polymers such as copolymers) employed as amorphous polymers in this invention are built up from one or more cycloolefins, where the cycloolefins employed are generally substituted or unsubstituted cycloalkenes and/or polycycloalkenes, such as, for example, bi-, tri- or tetracycloalkenes. The cycloolefin polymers may also be branched. Such products can have a comb or star structure.

Particular preference is given to cycloolefin copolymers containing at least one polycyclic olefin of the formulae I to VI below:

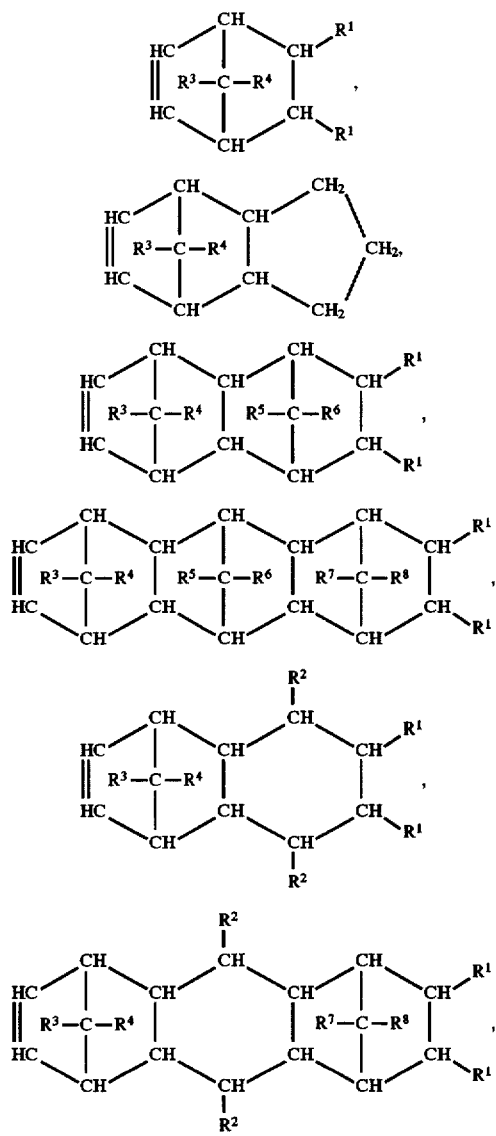

The radicals $R^1$ to $R^8$ in the formulae I to VI can be identical or different and are H, $C_6$—$C_{20}$—aryl, $C_1$—$C_{20}$—alkyl, F, Cl, Br, I or a monocyclic olefin of the formula VII below

    (VII)

in which n is a number from 2 to 10.

The cycloolefin polymers are preferably prepared with the aid of transition-metal catalysts, which are described in the abovementioned specifications. Preference is given to the preparation processes of EP-A-0 407 870 and EP-A-0 485 893, since these processes give cycloolefin polymers having a narrow molecular weight distribution ($M_w/M_n=2$). This avoids disadvantages such as migration, extractability or tack which can be attributed to low-molecular-weight constituents.

A particularly good property profile is achieved using cycloolefin polymers which have a moderate to high molecular weight in the range from 1000 to 200,000, preferably from 2000 to 180,000, in particular from 3000 to 150,000, most preferably at least about 10,000. The molecular weight is regulated during the preparation by using hydrogen and a specific choice of the catalyst and reaction conditions.

A multilayer film of this invention comprises at least two layers, the above-described base layer and at least one top layer. Further layers are optional, but preference is given to three-layer embodiments, particularly those which have a top layer on both sides of the base layer, it being possible for these top layers to be identical or different in thickness and composition. Preference is also given to five-layer embodiments, which preferably contain a base layer, interlayers applied to both sides of the base layer and top layers on both sides.

The overall thickness of the multilayer polyolefin film of this invention can vary within broad limits and depends on the intended use. For both heat-sealable and non-heat-sealable embodiments of the invention, film thickness can range from 3 to 100 µm, preferably from 5 to 60 or 70 µm, in particular from 10 to 15 µm, the base layer making up from about 50 to 90% of the total film thickness in the case of heat-sealable embodiments of the film, and from 50 to 97% of the total film thickness in the case of non-heat-sealable embodiments of the film.

The thickness of the top layer(s) is in the range of at least 0.1 µm to 5 µm, (preferably at least 0.2 µm to 5 µm in the case of heat-sealable top layers) and is preferably in the range from 0.3 to 2 µm, in particular greater than from 0.5 to 1 µm, where top layers on both sides can have identical or different thicknesses.

The thickness of any interlayer(s) present is, in each case independently of one another, from 1 to 12 µm, preferably from 2 to 8 µm, in particular from 3 to 6 µm. The values given are each based on one interlayer.

In addition to the discrete particle-forming amorphous component in the top or outermost layer, a multilayer film of this invention can additionally a variety of additives such as neutralizers, stabilizers, lubricants, hydrocarbon resins and/or antistatics in one or more layers. The percentages by weight given below relate to the weight of the respective layer to which the additive has been added.

Neutralizers are preferably dihydrotalcite, calcium stearate and/or calcium carbonate having a mean particle size of at most 0.7 µm, an absolute particle size of less than 10 µm and a specific surface area of at least 40 m²/g. In general, the neutralizer is added in an amount of from 0.02 to 0.1% by weight.

Stabilizers which can be added are the conventional stabilizing compounds for polymers of ethylene, propylene and other α-olefins. The amount in which they are added is between 0.05 and 2% by weight. Particularly suitable are phenolic stabilizers, alkali/alkaline earth metal stearates and/or alkali/alkaline earth metal carbonates. Phenolic stabilizers are preferred in an amount of from 0.1 to 0.6% by weight, in particular from 0.15 to 0.3% by weight, and having a molecular weight of greater than 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

Lubricants are higher aliphatic acid amides, higher aliphatic acid esters, waxes and metal soaps, and polydimethylsiloxanes. The effective amount of lubricant is in the range from 0.1 to 3% by weight. The addition of higher aliphatic acid amides in the range from 0.15 to 0.25% by weight to the base layer and/or the top layer (preferably the base layer) is particularly suitable. A particularly suitable aliphatic acid amide is erucamide.

Hydrocarbon resins are low-molecular-weight polymers whose molecular weight is generally in the range from 300 to 8000, preferably from 400 to 5000, in particular from 500 to 2000. The molecular weight of the resins is thus significantly lower than that of the propylene polymers which form the principal component of the individual film layers and generally have a molecular weight of greater than 100,000. The hydrocarbon resins are preferably added to the base layer and/or the interlayer(s) and are preferably not present in the top or outermost layers. The effective amount of low-molecular-weight resin is from 1 to 20% by weight, preferably from 2 to 10% by weight, based on the layer.

The low-molecular-weight resin recommended is a natural or synthetic resin having a softening point of from 60° to 180° C., preferably from 80° to 150° C., determined in accordance with ASTM E-28. Of the numerous low-molecular-weight resins, preference is given to hydrocarbon resins, specifically in the form of petroleum resins, styrene resins, cyclopentadiene resins and terpene resins (these resins are described in Ullmanns Encyklopädie der technischen Chemie [Ullmann's Encyclopedia of Industrial Chemistry], 4th Edition, Volume 12, pages 525 to 555). Suitable petroleum resins are described in numerous specifications, such as, for example, EP-A-0 180 087, which is expressly incorporated herein by way of reference.

Preferred antistatics are alkali metal alkanesulfonates, polyether-modified, i.e. ethoxylated and/or propoxylated, polydiorganosiloxanes (polydialkylsiloxanes, polyalkylphenylsiloxanes and the like) and/or the essentially straight-chain and saturated, aliphatic, tertiary amines containing an aliphatic radical having 10 to 20 carbon atoms which are substituted by ω-hydroxy-($C_1$–$C_4$)-alkyl groups, N,N-bis(2-hydroxyethyl)alkylamines having 10 to 20 carbon atoms, preferably 12 to 18 carbon atoms, in the alkyl radical being particularly suitable. The effective amount of antistatic is in the range from 0.05 to 3% by weight. A further preferred antistatic is glycerol monostearate.

The present invention furthermore relates to the production of the novel multilayer films by a coextrusion process. Coextrusion, which is known per se, produces a film comprising a plurality of layers from the extrusion die. The polymer or polymer mixture of the individual layers is compressed and liquefied in the extruder, it being possible for any additives added to be present in the polymer or polymer mixture already or to be added via the masterbatch method. The melts corresponding to the individual layers of the film are then coextruded simultaneously through a flat-film die (slot die), and the extruded multilayer film is drawn off over one or more take-off rolls, where it cools and solidifies.

A unique aspect of the coextrusion step is that, during the extrusion, the amorphous polymer forms discrete, substantially non-agglomerated particles in a matrix or continuous phase comprising the heat-sealable or non-heat-sealable olefin polymer of the top or outermost layer or layers. The mechanism by which this particle formation occurs is not fully understood, but it is known that the extrusion temperature should be above the glass transition temperature ($T_G$) or Vicat softening temperature ($T_V$) of the amorphous polymer, generally by at least 10° C., preferably from 15° to 180° C., in particular from 20° to 150° C. (above the $T_G$ or $T_V$). Apparently, the relative viscosities of the olefin polymer of the top layer and the amorphous polymer determine the particle size of the discrete amorphous polymer particles.

The amorphous polymers can be incorporated into the top layer or top layers of the film either as pure granules or as granulated concentrate (Masterbatch), by premixing the polyolefin granules or powder of the top layer(s) with the amorphous polymer and subsequently feeding the mixture to the extruder. In the extruder, the components are mixed further and warmed to the processing temperature. It has been found that the lubricant properties and the appearance of the film also depend on the extrusion conditions (temperature and shear). Surprisingly, the lubricant properties and appearance of the film vary with the conditions in the extruder under otherwise identical conditions with respect to raw materials and stretching process.

As indicated previously, it is assumed that the amorphous polymer liquefies under the usual extrusion conditions for film production and then surprisingly separates during the extrusion into substantially non-agglomerated particulate particles of a certain size, depending on the aforementioned viscosities. The amorphous polymer, which is simply added as solid, is thus, after the extrusion and orientation, in the form of the discrete particles in the top layer of the film which provide, among other things, antiblocking effects.

The layered film which results from coextrusion is stretched longitudinally and transversely to the extrusion direction, which results in orientation of the molecule chains. The stretching is preferably from 4:1 to 7:1 in the longitudinal direction and from 7:1 to 11:1 in the transverse direction. The longitudinal stretching is expediently carried out with the aid of two rolls running at different speeds corresponding to the desired stretching ratio, and the transverse stretching is expediently carried out with the aid of an appropriate tenter frame.

Biaxial stretching of the film is followed by heat-setting (heat treatment), the film being kept at a temperature of from 100° to 160° C. for about 0.5 to 10 seconds. The film is subsequently wound up in the conventional manner by means of a wind-up unit.

It has proven particularly favorable to keep the take-off roll or rolls, by means of which the extruded film is also cooled and solidified, at a temperature of from 20° to 90° C.

The temperatures at which longitudinal and transverse stretching are carried out can vary. In general, the longitudinal stretching is preferably carried out at from 100° to 150° C. and the transverse stretching is preferably carried out at from 155° to 190° C.

If desired, one or both surfaces of the film can, as mentioned above, be corona- or flame-treated by one of the known methods after the biaxial stretching.

In the case of corona treatment, the film is expediently passed between two conductor elements serving as electrodes, such a high voltage, usually alternating voltage (about 10 to 20 kV and 20 to 40 kHz, being applied between the electrodes that spray or corona discharges can occur. The spray or corona discharge ionizes the air above the film surface and reacts with the molecules of the film surface, causing formation of polar inclusions in the essentially nonpolar polymer matrix.

For flame treatment with a polarized flame (cf. U.S. Pat. No. 4,622,237), a direct electric voltage is applied between a burner (negative pole) and a chill roll. The level of the applied voltage is between 500 and 3000 V, preferably in the range from 1500 to 2000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer here is substantially less than in the case of standard flame treatment, and films can be obtained in which the heat-sealing properties of the treated side are even better than those of the untreated side.

Layered films of this invention have better gloss and less haze than known films having low coefficients of friction, but they also have both a low coefficient of friction and low surface roughness. The coefficient of sliding friction of lubricant-free embodiments of the novel films is generally in the range from 0.3 to 0.7, preferably from 0.3 to 0.5. Films additionally containing a lubricant, such as, for example, fatty acid amide, in particular erucamide, have an even further reduced coefficient of sliding friction. In the case of the novel film containing erucamide in the base layer, this is generally in the range from 0.05 to 0.3, preferably from 0.1 to 0.2. The gloss of the novel film is in the range from 90 to 130, preferably from 105 to 130. The haze of transparent embodiments is in the range from 0.9 to 3.0, preferably in the range from 0.9 to 2.0.

Layered films made according to this invention can be printable and suitable for lamination to substrates such as paper or board. Heat-sealable layered films of this invention are particularly well-suited for use as packaging materials.

The principle and practice of this invention is now illustrated in detail in the following non-limiting working examples.

EXAMPLES 1 AND 2 AND COMPARATIVE EXAMPLES 1 TO 4

(Heat Sealable Films)

Example 1

A three-layer film having an overall thickness of 20 μm and an ABA layer structure, i.e. the base layer B was surrounded by two identical top layers A, was produced by coextrusion and subsequent stepwise orientation in the longitudinal and transverse directions.

The film was subjected to one-sided corona treatment on the roll side before rolling up. The roll side is the side of the film with which it is in contact with the first take-off roll. The surface tension on this side as a consequence of this treatment was from 39 to 40 mN/m. All layers contained 0.13% by weight of pentaerythrityl tetrakis[4-(3,5-di-tert-butyl-4-hydroxyphenyl)propionate] (®Irganox 1010) as stabilizer and 0.06% by weight of calcium stearate as neutralizer.

The base layer B essentially comprised a propylene homopolymer having an n-heptane-soluble content of 4% by weight and a melting range of from 160° to 162° C. The melt flow index of the propylenehomopolymer was 3.4 g/10 min at 230° C. and a load of 21.6N (DIN 53 735). The base layer contained 0.12% by weight of erucamide having a melting range of from 78° to 82° C. and 0.12% by weight of N,N-bis-ethoxyalkylamine (®Armostat 300).

The polyolefinic top layers essentially comprised an ethylene-propylene-1-butene terpolymer containing 3.5% by weight of ethylene, 88.5% by weight of propylene and 8% by weight of 1-butene. The top layers contained 0.05% by weight of a cyclic olefin copolymer having a $T_G$ of 174° C. and a mean molecular weight of 34,000. Each of the top layers was 0.8 μm thick.

Example 2

Example 1 was repeated, but the top layer contained 0.15% by weight of the same cycloolefin copolymer.

Comparative Example 1

Example 1 was repeated, but the antiblocking agent employed was 0.15% by weight of a crosslinked silicone resin powder having a mean particle diameter of 2 μm (®Tospearl 20 from Toshiba Silicone Co., Ltd.).

Comparative Example 2

Example 1 was repeated, but the antiblocking agent employed was 0.15% by weight of an organically coated silicon dioxide having a mean particle diameter of 2 μm (®Sylobloc 44 from Grace).

Comparative Example 3

Comparative Example 1 was repeated, but the top layer contained 0.33% by weight of the silicone resin powder.

Comparative Example 4

Comparative Example 2 was repeated, but the top layer contained 0.33% by weight of the coated silicon dioxide.

EXAMPLES 3 AND 4 AND COMPARATIVE EXAMPLES 5 TO 8

(Non-heat-sealable films)

Example 3

A three-layer film having an overall thickness of 20 μm and an ABA layer structure, i.e. the base layer B was surrounded by two identical top layers A, was produced by coextrusion and subsequent stepwise orientation in the longitudinal and transverse directions.

The film was subjected to one-sided corona treatment on the roll side before rolling up. The roll side is the side of the film with which it is in contact with the first take-off roll. The surface tension on this side as a consequence of this treatment was from 39 to 40 mN/m. All layers contained 0.13% by weight of pentaerythrityl tetrakis[4-(3,5-di-tert-butyl-4-hydroxyphenyl)propionate] (®Irganox 1010) as stabilizer and 0.06% by weight of calcium stearate as neutralizer.

The base layer B essentially comprised a propylene homopolymer having an n-heptane-soluble content of 4% by weight and a melting range of from 160° to 162° C. The melt flow index of the propylenehomopolymer was 3.4 g/10 min at 230° C. and a load of 21.6N (DIN 53 735). The base layer contained 0.12% by weight of erucamide having a melting range of from 78° to 82° C. and 0.12% by weight of N,N-bis-ethoxyalkylamine (®Armostat 300).

The polyolefinic top layers consisted essentially of an isotactic propylene homopolymer having an n-heptane-soluble content of 4.0% by weight and a melting point of 160° C.

The top layers contained 0.05% by weight of a cyclic olefin copolymer having a $T_G$ of 174° C. and a mean molecular weight of 34,000. Each of the top layers was 0.4 μm thick.

Example 4

Example 3 was repeated, but the top layer contained 0.15% by weight of the same cycloolefin copolymer.

Comparative Example 5

Example 3 was repeated, but the antiblocking agent employed was 0.15% by weight of a crosslinked silicone resin powder having a mean particle diameter of 2 μm (®Tospearl 20 from Toshiba Silicone Co., Ltd.).

Comparative Example 6

Example 3 was repeated, but the antiblocking agent employed was 0.15% by weight of an organically coated silicon dioxide having a mean particle diameter of 2 μm (®Sylobloc 44 from Grace).

Comparative Example 7

Comparative Example 5 was repeated, but the top layer contained 0.33% by weight of the silicone resin powder.

Comparative Example 8

Comparative Example 6 was repeated, but the top layer contained 0.33% by weight of the coated silicon dioxide.

The following measurement methods were used to characterize the raw materials and the films:

Melt flow index

The melt flow index was measured in accordance with DIN 53 735 at a load of 21.6N and at 230° C.

Melting point

DSC measurement, maximum of the melting curve, heating rate 20° C./min.

Determination of the minimum sealing temperature

Heat-sealed samples (seal seam 20 mm×100 mm) are produced using a Brugger HSG/ET sealing unit by sealing a film at different temperatures with the aid of two heated sealing jaws at a sealing pressure of 10N/cm² and a sealing time of 0.5 s. Test strips 15 mm in width are cut out of the sealed samples. The T-seal seam strength, i.e. the force necessary to separate the test strips, is determined using a tensile testing machine at a take-off rate of 200 mm/min, the seal seam plane forming a right angle with the tension direction. The minimum sealing temperature is the temperature at which a seal seam strength of at least 0.5N/15 mm is achieved.

Seal seam strength

For the measurement, two film strips 15 mm in width were laid one on top of the other and sealed for 0.5 s at 130° C. and a sealing pressure of 1.5N/mm² (Brugger NDS unit, sealing jaws heated on one side). The seal seam strength was determined by the T-peel method.

Friction

The friction was determined in accordance with DIN 53 375. The coefficient of sliding friction was measured 14 days after production.

Surface tension

The surface tension was determined by the ink method (DIN 53 364).

Roughness

The roughness was determined in accordance with DIN 4768 at a cut-off of 0.25 mm.

Haze

The haze of the film was measured in accordance with ASTM-D 1003-52. The Hölz haze measurement was carried out in accordance with ASTM-D 1003-52, but, in order to utilize the optimum measurement range, the measurement was carried out on four film layers lying one on top of the other and using a 1° slit diaphragm instead of a 4° C. pinhole diaphragm.

Gloss

The gloss was determined in accordance with DIN 67 530. The reflector value was measured as an optical parameter for the surface of a film. In accordance with the ASTM-D 523-78 and ISO 2813 standards, the angle of incidence was set at 20° or 60°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

The properties of the films of all the examples and comparative examples are summarized in Table I (heat-sealable films) and Table II (non-heat-sealable films), below.

TABLE I (HEAT-SEALABLE FILMS)

| | Gloss | | Haze | | Minimum sealing temperature MST [°C.] 10 N/cm²; 0.5 s | | Coefficient of sliding friction | Roughness | |
|---|---|---|---|---|---|---|---|---|---|
| | Measurement angle 20° | Measurement angle 60° | Hölz 4 layer | ASTM-D 1003 1 layer | A - A | B - B | A - B | A - A | B - B |
| E1 | 120 | 145 | 22 | 1.4 | 112 | 118 | 0.18 | 0.65 | 0.51 |
| E2 | 115 | 140 | 25 | 1.8 | 114 | 120 | 0.17 | 0.70 | 0.78 |
| CE1 | 108 | 135 | 39 | 3.9 | 116 | 120 | 0.17 | 0.55 | 0.58 |
| CE2 | 105 | 135 | 35 | 3.5 | 112 | 118 | 0.32 | 1.1 | 1.23 |
| CE3 | 102 | 133 | 43 | 4.2 | 116 | 120 | 0.17 | 0.60 | 0.77 |
| CE4 | 102 | 128 | 41 | 3.7 | 116 | 120 | 0.3 | 1.3 | 1.45 |

E = Example
CE = Comparative Example
A = Roll side
B = Air side

TABLE II

(NON-HEAT-SEALABLE FILMS)

| | Gloss Measurement | Haze | | Coefficient of sliding friction | Roughness | |
|---|---|---|---|---|---|---|
| | angle 20° | Hölz 4 layer | ASTM-D 1003 1 layer | A - B | A - A | B - B |
| E3 | 145 | 9 | 0.6 | 0.18 | 0.35 | 0.37 |
| E4 | 140 | 10 | 0.7 | 0.17 | 0.33 | 0.41 |
| CE5 | 125 | 17 | 1.0 | 0.17 | 0.35 | 0.34 |
| CE6 | 122 | 15 | 1.0 | 0.27 | 0.39 | 0.41 |
| CE7 | 125 | 18 | 1.2 | 0.17 | 0.37 | 0.36 |
| CE8 | 120 | 17 | 1.3 | 0.25 | 0.41 | 0.45 |

E = Example
CE = Comparative Example
A = roll side
B = air side

What is claimed is:

1. An oriented, coextruded, layered olefin polymer film comprising a polyolefinic base layer and at least one heat-sealable or non-heat-sealable top layer, wherein said heat-sealable or non-heat-sealable top layer comprises a minor amount of at least one amorphous polymer which is in said top layer in the form of discrete, substantially non-agglomerated particles of said amorphous polymer, said substantially non-agglomerated particles having been formed during the coextrusion of said coextruded, layered olefin polymer film at a temperature which is at least 10° C. above the glass transition temperature, $T_G$, or at least 10° C. above the Vicat softening temperature, $T_V$, of the amorphous polymer.

2. An olefin polymer film as claimed in claim 1, wherein the top layer comprises a major amount of an olefin polymer and said manor amount of amorphous polymer is an antiblocking effective amount, not exceeding a maximum of 5% by weight, based on the weight of said top layer.

3. An olefin polymer film as claimed in claim 2, wherein said antiblocking effective amount ranges from 0.001 to 3% by weight, based on the weight of said top layer.

4. An olefin polymer film as claimed in claim 2, wherein the particles of amorphous polymer have a mean particle diameter ranging from 0.2 to 10 μm.

5. An olefin polymer film as claimed in claim 4, wherein said mean particle diameter ranges from 0.5 to 5 μm.

6. An olefin polymer film as claimed in claim 1, wherein the amorphous polymer has a glass transition temperature, $T_G$, in the range from 70° to 300° C. or a Vicat softening temperature, $T_V$, of from 70° to 200° C.

7. An olefin polymer film as claimed in claim 1, wherein the amorphous polymer has a degree of crystallinity of less than 5% and a weight-average molecular weight, $M_w$, of from 500 to 500,000.

8. An olefin polymer film as claimed in claim 7, wherein the weight-average molecular weight ranges from about 10,000 to about 150,000.

9. An olefin polymer film as claimed in claim 1, wherein the amorphous polymer has a refractive index of from 1.3 to 1.7, and this refractive index is at most 0.1 unit greater than or less than the refractive index of the olefin polymer of said olefin polymer film.

10. An olefin polymer film as claimed in claim 1, wherein the amorphous polymer is in bulk form or in dispersion form and is a synthetic rubber having a $T_G$ in the range of 70° to 120° C., an atactic polystyrene, poly-α-methylstyrene, polycarbonate, polyacrylate, a cyclic olefin polymer, polyvinylcarbazole, atactic polvinylcyclohexane, polyvinyl chloride, polyacrylonitrile, or a natural resin.

11. An olefin polymer as claimed in claim 10, wherein said amorphous polymer comprises at least one cyclic olefin copolymer having a weight-average molecular weight of about 10,000 to about 150,000 and a glass transition temperature $T_G$ in the range from 70° to 300° C. or a Vicat softening temperature $T_V$ in the range from 70° to 200° C.

12. An olefin polymer film as claimed in claim 1, wherein the particles of amorphous polymer are approximately spherical and satisfy the following condition:

$$f = \sqrt{A/(\pi/4)} \; /D_{max}$$

in which f is greater than 0.5, and A is the cross-sectional area in mm² and $D_{max}$ is the maximum diameter of the cross-sectional area in mm.

13. An olefin polymer film according to claim 12, wherein f ranges from 0.7 to 1.

14. An olefin polymer film as claimed in claim 1, wherein said top layer has a thickness of from 0.2 to 2 μm.

15. An olefin polymer film as claimed in claim 1, wherein said film is white or opaque and has a light transparency, measured in accordance with ASTM-D 1039-77, of at most 50%.

16. A sealed package comprising an oriented, layered, heat-sealable, olefin polymer film as claimed in claim 1.

17. An oriented, layered, olefin polymer film as claimed in claim 1 with printing thereon.

18. A laminate comprising an oriented, layered, olefin polymer film as claimed in claim 1, laminated to paper, board or a thermoplastic film.

* * * * *